UNITED STATES PATENT OFFICE.

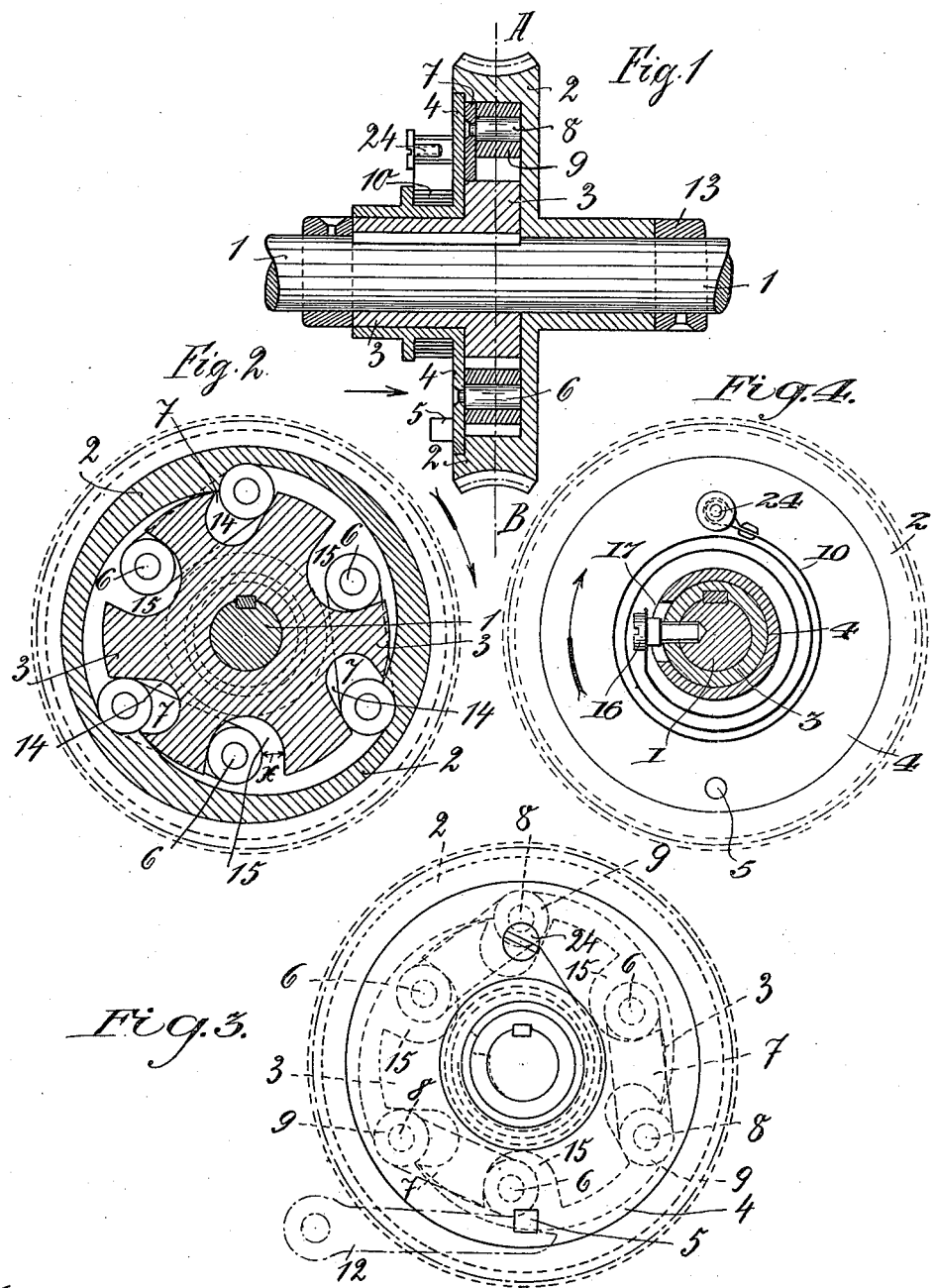

CARL TROG, OF BIELEFELD, GERMANY, ASSIGNOR TO COMPANY ANKER-WERKE A. G. VORMALS HENGSTENBERG & CO., OF BIELEFELD, PRUSSIA, GERMANY.

AUTOMATIC INTERMITTENT COUPLING.

1,006,806.        Specification of Letters Patent.     Patented Oct. 24, 1911.

Application filed July 18, 1910. Serial No. 572,481.

*To all whom it may concern:*

Be it known that I, CARL TROG, a subject of the King of Prussia, and resident of Bielefeld, in the Province of Westphalia, German Empire, have invented certain new and useful Improvements in Automatic Intermittent Couplings, of which the following is a specification.

This invention relates to improvements in and relating to automatic intermittent couplings and more particularly to such couplings of the kind described in the specification of my prior Letters Patent No. 910609.

The principal object of this invention is to increase the rate of operation of the automatic machine to which the coupling is connected. To this end the coupling is so constructed that when the automatic machine is required to perform the same function several times in immediate succession the coupling remains closed during the whole series of operations and upon the machine being automatically stopped is immediately thrown out of gear without necessitating the simultaneous stoppage of the motor.

In carrying this invention into effect a slotted member rigidly secured to the driven shaft is connected to a driving member, which may be continuously rotated, by coupling levers which are pivoted on a disk connected to the driven shaft by a spring device and adapted to open the coupling. The arrangement being such that when the disk is prevented from rotating the coupling levers by their movement in the somewhat overrunning slotted member are drawn out of engagement with the driving faces of the driving member whereas when the disk is unlocked the coupling levers are again put into contact with the driving faces on the driving member under the influence of the spring device which connects the driven shaft with the disk carrying the coupling levers.

As an example a suitable construction for carrying the subject matter of the present invention into effect is illustrated in the accompanying drawing, Figure 1 being a longitudinal section, Fig. 2 a section on the line A—B of Fig. 1, and Fig. 3 an end view looking in the direction of the arrow in Fig. 1. Fig. 4 is a sectional end view of Fig. 1.

Referring to the drawings 1 is a shaft to be driven, upon which a driven star shaped or slotted member 3 is rigidly secured. Between the slotted member 3 and an adjustable collar 13 there is freely mounted upon the shaft 1 a driving member or disk 2. In the construction illustrated the driving member or disk 2 is shown formed as a worm-wheel. Loosely mounted upon the extended boss of the driven member or disk 3 is another disk 4 carrying on the side adjacent to the slotted member 3 symmetrically arranged coupling levers 7 rotatable about pivot pins 6 secured to the disk 4. The coupling levers 7 each carry at the free end a pin 8, upon which is mounted a roller 9 which can swing in a corresponding slot 14 in the slotted member 3, the sides of said slot 14 forming an abutment for the roller 9. The driving disk 2 is formed on the inner side with a series of eccentric surfaces which in the position shown in Fig. 2 lie in advance of the rollers 9. On the side of the disk 4 which is the more remote from the slotted member 3 there is arranged a stop 5 which is adapted to coöperate with a lever 12, as shown in Fig. 3. A spring 10 is wound on the boss of the disk 4 having one end connected to the disk 4 by a screw 24 and the other end connected to the driven shaft 1 by means of a screw 16 passing through a slot 17 in the boss of the disk 4 and screwed into the shaft 1. The object of this spring is to provide a constant opposing force between the disk 2 and the slotted member 3 so that the latter is always subjected to a force tending to move it in a direction opposite to the direction of rotation of the coupling. In the absence of the spring 10 the slots 15 in the slotted member 3 into which the coupling levers 7 with their pivot pins 6 project, would permit of a free lost motion to the extent of the width of the slots minus the diameter of the boss of the coupling levers. On the other hand as will be described later the slots 15 are necessary for the proper working of the coupling.

The working of the coupling according to the present invention is as follows:—The driving disk 2 is caused to rotate by the driving device of the automatic machine or cash register, for instance by a motor, when the eccentric projections remain in advance of the rollers 9 on the coupling levers 7. The rollers 9 are constrained to roll in the slots 14 outward so that the slotted member 3 and the driving disk 2 are coupled together, in consequence of which the driven shaft 1 is caused to rotate. When the coupling is to be opened the lever 12 is moved into the path of the stop 5, whereupon the disk 4 with its coupling levers 7 will be stopped. The slotted member owing to its momentum will however continue to rotate as far as the clearance $x$ between the boss on a coupling lever 7 and the wall of the slot 15 permits, thus increasing the tension of the spring 10. As the pressure on the rollers 9 exerted by the eccentric projections on the driving disk continues the rollers 9 are unable to follow the movement of rotation as the coupling levers 7 are connected to the arrested disk 4. In consequence the rollers 9 yield to the pressure exerted by the inner surfaces of the driving disk 2 and roll inward in the slots 14 of the slotted member 3. As the driving disk 2 continues to revolve the projections pass around the slotted member without effect. When the coupling is to be closed again the lever 12 is removed from the path of movement of the stop 5. The disk 4 thus freed partially rotates under the influence of the spring wound up by the previous further movement of the slotted member 3 with respect to the shaft 1, until it has reached the position above referred to. In consequence of this the rollers 9 on the coupling levers 7 of the disk 4 move in the slots 14 outward into the path of the eccentric projections on the driving disk 2 whereby the shaft 1 is again rotated.

I claim:—

1. The combination with a shaft to be driven of a disk, a coupling lever pivoted on said disk, a slotted member provided with an abutment for the free end of said coupling lever and fixed on said shaft, a driving member, an abutment on said driving member for the free end of said coupling lever, a spring device adapted to connect said disk with said shaft and tending to rotate said disk in a direction opposite to that of said driving member so as to normally hold the free end of said coupling lever between the abutment on said slotted member, and that on said driving member, and means for arresting the motion of said disk as and when desired, whereby when said disk is arrested, said coupling lever can rotate about its pivot clear of the abutment on said driving member.

2. The combination with a shaft to be driven of a disk, a series of coupling levers pivoted on said disk, a slotted member provided with an abutment for the free end of said coupling levers, and fixed on said shaft, a driving member, an abutment on said driving member for the free end of each of said coupling levers, a spring device adapted to connect said disk with said shaft and tending to rotate said disk in a direction opposite to that of said driving member so as to normally hold the free ends of said coupling levers between the abutments on said slotted member and those on said driving member, and means for arresting the motion of said disk as and when desired, whereby when said disk is arrested, said coupling levers can rotate about their pivots clear of the abutments on said driving member.

3. The combination with a shaft to be driven of a disk, a series of coupling levers pivoted on said disk, rollers mounted on the free ends of said levers, a slotted member provided with an abutment for each of said rollers and fixed on said shaft, a driving member, a circular series of eccentric surfaces on said driving member adapted to form an abutment for each of said rollers, a spring device adapted to connect said disk with said shaft and tending to rotate said disk in a direction opposite to that of said driving member so as to normally hold said rollers between the abutments on said slotted member and those on said driving member, means for normally arresting the motion of said disk and for freeing said disk when and as long as required, whereby when said disk is arrested, said levers can rotate on their pivots so that said rollers clear the abutments on said driving member.

In witness whereof I have hereunto set my hand in the presence of two witnesses.

CARL TROG.

Witnesses:
 OTTO SANBURG,
 RI. BÜLOW.

---

Copies of this patent may be obtained for five cents each, by addressing the "Commissioner of Patents, Washington, D. C."